US012583468B2

(12) United States Patent
Kashi et al.

(10) Patent No.: US 12,583,468 B2
(45) Date of Patent: Mar. 24, 2026

(54) SIGNAL DISTRIBUTION TO AND/OR FROM CONTROLLERS IN VEHICLE

(71) Applicant: Atieva, Inc., Newark, CA (US)

(72) Inventors: Mostafa Kashi, Sunnyvale, CA (US);
Selvakumar Sonai, Fremont, CA (US);
Rajesh Subramanyam, Fremont, CA
(US); Logesh Sekar, Fremont, CA (US)

(73) Assignee: Atieva, Inc., Newark, CA (US)

( * ) Notice: Subject to any disclaimer, the term of this
patent is extended or adjusted under 35
U.S.C. 154(b) by 286 days.

(21) Appl. No.: 18/364,752

(22) Filed: Aug. 3, 2023

(65) Prior Publication Data

US 2025/0042421 A1     Feb. 6, 2025

(51) Int. Cl.
B60W 50/035     (2012.01)
B60R 16/023     (2006.01)
B60W 50/14     (2020.01)

(52) U.S. Cl.
CPC ....... B60W 50/035 (2013.01); B60R 16/0231
(2013.01); B60R 16/0238 (2013.01); **B60W
50/14 (2013.01); B60W 2420/403** (2013.01)

(58) Field of Classification Search
CPC ............. B60W 30/0953; B60W 40/10; B60W
50/0205; B60W 50/0225; B60W 50/035;
B60W 50/06; B60W 50/14; B60W
60/0001; B60W 60/0015; B60W 2540/18;
B60R 1/27; B60R 16/0231; B60R
16/0238; G06V 10/98; G06V 20/56;
G09G 3/2092; H04L 63/1441; H04L
63/1416; H04L 67/12
USPC .......................................................... 701/23
See application file for complete search history.

(56) References Cited

U.S. PATENT DOCUMENTS

| | | | |
|---|---|---|---|
| 9,769,519 B2 | 9/2017 | Ogle et al. | |
| 10,333,743 B2 | 6/2019 | Chen | |
| 10,622,803 B2 | 4/2020 | Dragoi et al. | |
| 10,750,119 B2 | 8/2020 | Vaid et al. | |
| 11,438,507 B2 | 9/2022 | Boron et al. | |
| 11,528,155 B2 | 12/2022 | Kim et al. | |

(Continued)

FOREIGN PATENT DOCUMENTS

| | | |
|---|---|---|
| EP | 4280013 A1 | 11/2023 |
| WO | 2022199696 A1 | 9/2022 |

(Continued)

OTHER PUBLICATIONS

International Search Report and Written Opinion for PCT Application No. PCT/US2024/040681, mailed on Nov. 28, 2024, 14 pages.,.

(Continued)

*Primary Examiner* — Andrew Joseph Rudy
(74) *Attorney, Agent, or Firm* — Brake Hughes
Bellermann LLP

(57) ABSTRACT

A system in a vehicle for distributing signals to controllers comprises: an advanced driver assistance system (ADAS) controller configured for controlling an ADAS of the vehicle; an infotainment controller configured for controlling an infotainment system of the vehicle; a sensor device; and a switch, the switch being powered by power over coaxial from the ADAS controller or the infotainment controller, the switch configured for distribution of a first signal from the sensor device to either of the ADAS controller or the infotainment controller.

21 Claims, 8 Drawing Sheets

(56) References Cited

U.S. PATENT DOCUMENTS

| | | | |
|---|---|---|---|
| 11,647,164 B2 * | 5/2023 | Mobbs | G05D 1/0231 |
| | | | 348/148 |
| 2013/0131908 A1 * | 5/2013 | Trepagnier | B60W 30/00 |
| | | | 701/1 |
| 2019/0132555 A1 | 5/2019 | Chu et al. | |
| 2020/0039448 A1 * | 2/2020 | Lu | H04N 7/18 |
| 2022/0258728 A1 | 8/2022 | Heirung et al. | |
| 2022/0315037 A1 | 10/2022 | Wankhede et al. | |
| 2022/0417472 A1 | 12/2022 | Mobbs | |
| 2023/0044279 A1 | 2/2023 | Lu | |
| 2023/0322215 A1 * | 10/2023 | Patel | B60K 35/22 |
| | | | 701/26 |
| 2024/0424999 A1 * | 12/2024 | Winden | B60R 1/24 |

FOREIGN PATENT DOCUMENTS

| | | | |
|---|---|---|---|
| WO | 2023064722 A1 | 4/2023 | |
| WO | 2023064723 A1 | 4/2023 | |

OTHER PUBLICATIONS

Leung, J.: "Power over Coax: a Design Guide for Automotive Applications," Texas Instruments, Technical Article, 2023, 3 pages.
Triplett Test Equipment & Tools, "Power Over Coax," 2025, 9 pages.
Wilson, M.: "PoE vs PoC: What is better?" AT Security Cameras, Aug. 3, 2020, 9 pages.

* cited by examiner

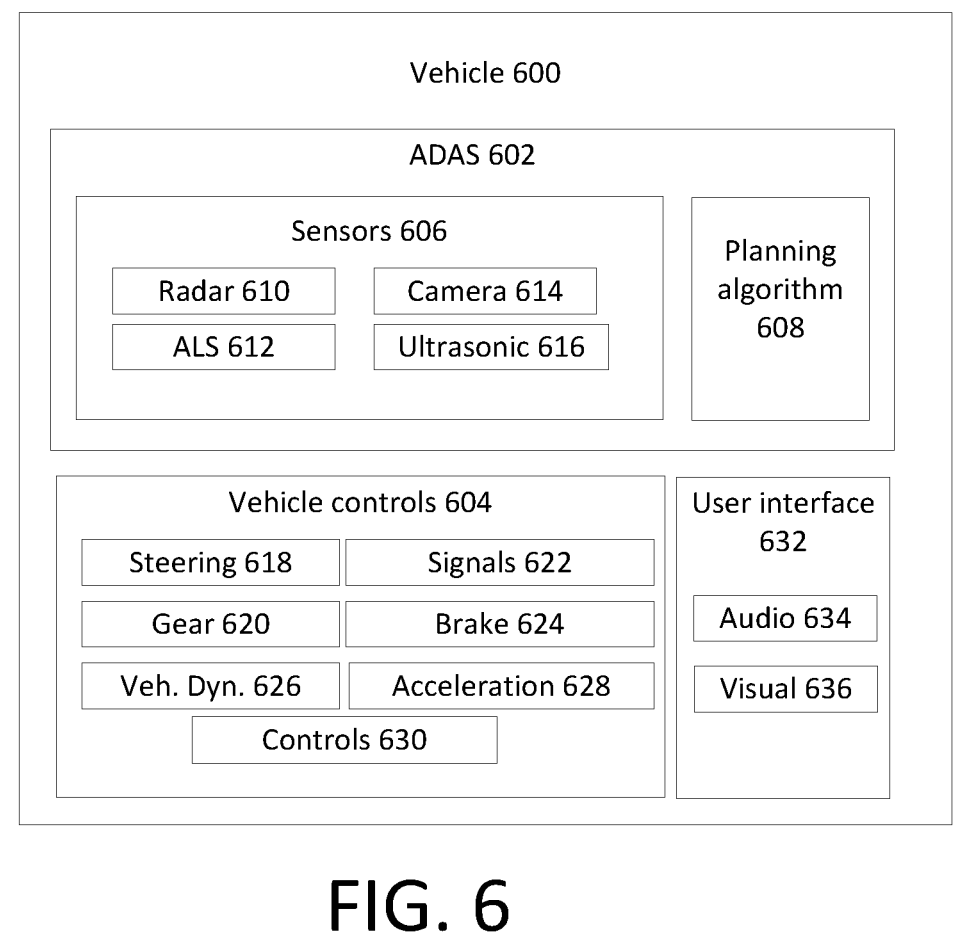

Vehicle 600

ADAS 602

Sensors 606

Radar 610

ALS 612

Camera 614

Ultrasonic 616

Planning algorithm 608

Vehicle controls 604

Steering 618

Gear 620

Veh. Dyn. 626

Signals 622

Brake 624

Acceleration 628

Controls 630

User interface 632

Audio 634

Visual 636

FIG. 6

SIGNAL DISTRIBUTION TO AND/OR FROM CONTROLLERS IN VEHICLE

TECHNICAL FIELD

This disclosure relates to signal distribution to and/or from controllers in a vehicle.

BACKGROUND

Some modern vehicles are equipped with an advanced driver assistance system (ADAS) that makes use of sensors (e.g., radar, cameras, a light detection and ranging (LiDAR) device, and/or ultrasonic transducers) to perform its operations. Typically, the sensors used by the ADAS are interfaced into the ADAS module. Some vehicles also have infotainment systems for functions such as media, navigation, communication, or vehicle control.

SUMMARY

In a first aspect, a system in a vehicle for distributing signals to controllers comprises: an advanced driver assistance system (ADAS) controller configured for controlling an ADAS of the vehicle; an infotainment controller configured for controlling an infotainment system of the vehicle; a sensor device; and a switch, the switch being powered by power over coaxial from the ADAS controller or the infotainment controller, the switch configured for distribution of a first signal from the sensor device to either of the ADAS controller or the infotainment controller.

Implementations can include any or all of the following features. The sensor device comprises a camera of the vehicle. The sensor device comprises multiple cameras distributed around the vehicle and directed towards surroundings of the vehicle, and wherein the system further comprises multiple switches, each for a corresponding one of multiple isolated channels for the multiple cameras. The camera includes a serializer configured to perform serialization that generates the first signal. The system is configured to operate in a sentry mode, wherein in the sentry mode the ADAS controller is turned off, and wherein in the sentry mode the infotainment controller provides the power over coaxial to the switch, and the switch distributes the first signal to the infotainment controller. The system further comprises a display device in the vehicle, wherein the infotainment controller is configured to generate a second signal for the display device in the sentry mode, the second signal based on the first signal from the camera. The switch comprises at least one selected from the group consisting of a radiofrequency switch, a semiconductor device, a digital switch, a multiplexer, a demultiplexer, or a mechanical switch. The switch is separate from the ADAS controller and from the infotainment controller. The switch is integrated into the ADAS controller, and wherein the infotainment controller is interfaced to the ADAS controller. The switch is integrated into the infotainment controller, and wherein the ADAS controller is interfaced to the infotainment controller. The switch is integrated into the sensor device. The switch is configured so that: i) whichever one of the ADAS controller or the infotainment controller provides the power over coaxial to the switch, the switch distributes the first signal to that one of the ADAS controller or the infotainment controller; and ii) in case both of the ADAS controller and the infotainment controller simultaneously provide the power over coaxial to the switch, the switch has a prioritization to distribute the first signal to only one of the ADAS controller or the infotainment controller. The prioritization is to distribute the first signal to the ADAS controller. The prioritization is to distribute the first signal to the infotainment controller. The system further comprises an interface between the ADAS controller and the infotainment controller, wherein the ADAS controller is configured to provide a second signal via the interface for receipt by the infotainment controller without the second signal passing through the switch.

In a second aspect, a system in a vehicle for distributing signals from controllers comprises: an advanced driver assistance system (ADAS) controller configured for controlling an ADAS of the vehicle; an infotainment controller configured for controlling an infotainment system of the vehicle; a display device; and a switch, the switch being powered by power over coaxial from the ADAS controller or the infotainment controller, the switch configured for distribution of a first signal from either of the ADAS controller or the infotainment controller to the display device.

Implementations can include any or all of the following features. The switch comprises at least one selected from the group consisting of a radiofrequency switch, a semiconductor device, a digital switch, a multiplexer, a demultiplexer, or a mechanical switch. The switch is separate from the ADAS controller and from the infotainment controller. The switch is integrated into the ADAS controller, and wherein the infotainment controller is interfaced to the ADAS controller. The switch is integrated into the infotainment controller, and wherein the ADAS controller is interfaced to the infotainment controller. The switch is configured so that: i) whichever one of the ADAS controller or the infotainment controller provides the power over coaxial to the switch, the switch distributes the first signal, generated by that one of the ADAS controller or the infotainment controller, to the display device; and ii) in case both of the ADAS controller and the infotainment controller simultaneously provide the power over coaxial to the switch, the switch has a prioritization to distribute the first signal, generated by that one of the ADAS controller or the infotainment controller, to the display device.

BRIEF DESCRIPTION OF DRAWINGS

FIG. 6 shows another example of a vehicle.

Like reference symbols in the various drawings indicate like elements.

DETAILED DESCRIPTION

Figure 1:
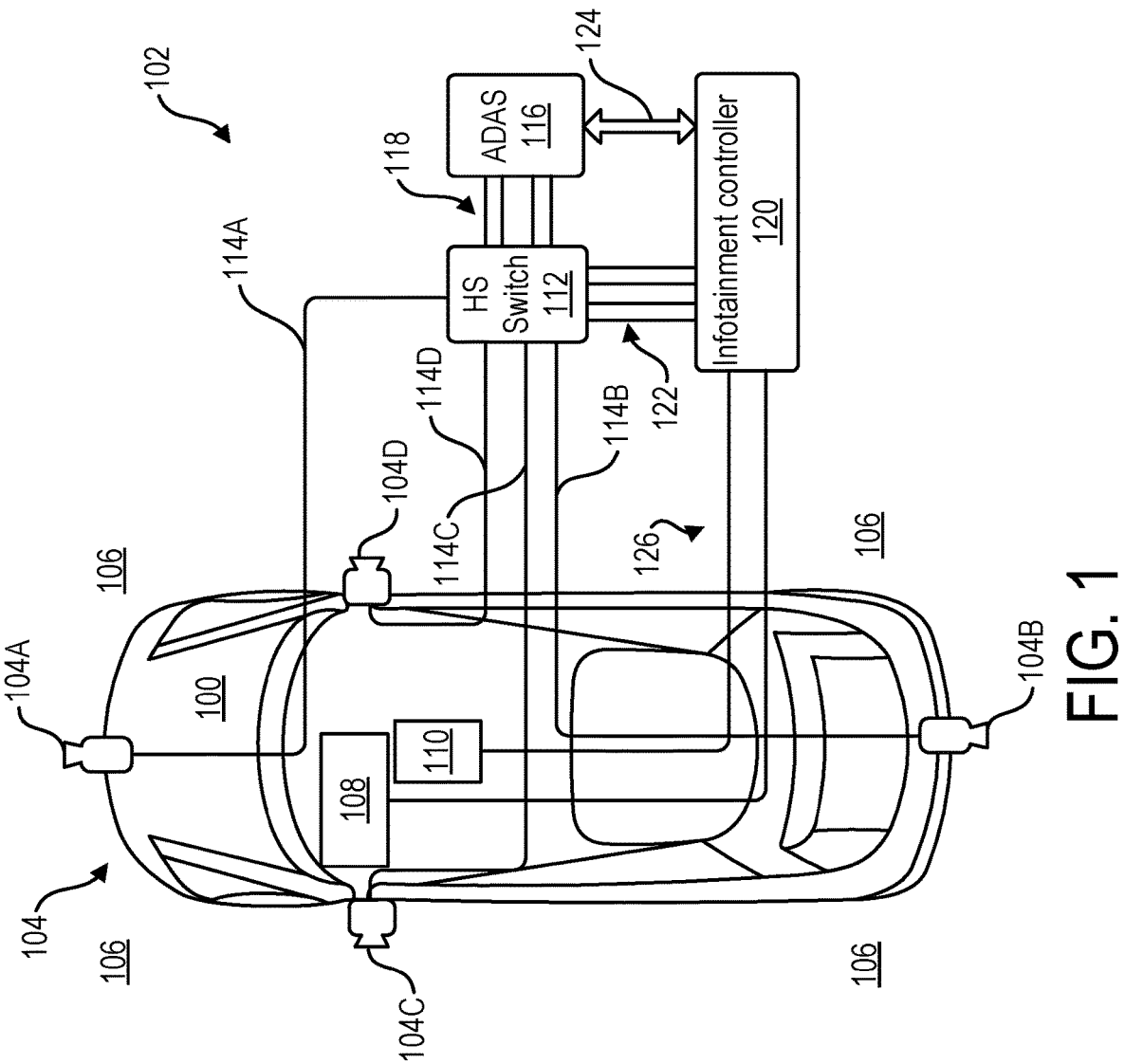
FIG. 1 shows an example of a vehicle with a system for distributing signals to and/or from multiple controllers.

This document describes examples of systems and techniques for distributing signals to and/or from multiple controllers of a vehicle. A high speed switch and "power over coaxial" power supply can be used to rout a signal (e.g., one or more camera feeds) to or from any of multiple controllers of the vehicle based on the vehicle state. In some implementations, while an ADAS is powered up a camera output may be routed to an ADAS controller, and when the ADAS powers down the camera output can instead be routed to an infotainment controller. For example, this can facilitate implementation of a sentry mode in the vehicle where the camera feed is presented on a display device.

By contrast, implementing the sentry mode can be more challenging if the cameras are interfaced directly to the ADAS controller. Namely, the ADAS module can require a significant amount of power to activate and to process the camera feeds. Moreover, the processed video should then be sent to the infotainment controller for recording as well as to facilitate presentation on the display device in the vehicle. Depending on the specifics of the ADAS controller, such an approach can take significantly longer time to boot up.

Implementations of the present subject matter can provide one or more of the following advantages and/or others. A camera feed can automatically be switched between two or more vehicle controllers based on the vehicle power mode without any additional control signals. No external power is needed. A solution can operate on an existing power over coax, which may be used for powering the camera from the controller. Power consumption for the routing can be kept very low (e.g., on the order of milliwatts). A failure rate can be very low; for example, if one of multiple signal channels fails, the other channels can continue to operate. A cost of implementation can be very low.

Examples described herein refer to a vehicle. A vehicle is a machine that transports passengers or cargo, or both. A vehicle can have one or more motors using at least one type of fuel or other energy source (e.g., electricity). Examples of vehicles include, but are not limited to, cars, trucks, and buses. The number of wheels can differ between types of vehicles, and one or more (e.g., all) of the wheels can be used for propulsion of the vehicle. The vehicle can include a passenger compartment accommodating one or more persons. At least one vehicle occupant can be considered the driver; various tools, implements, or other devices, can then be provided to the driver. In examples herein, any person carried by a vehicle can be referred to as a "driver" or a "passenger" of the vehicle, regardless whether the person is driving the vehicle, or whether the person has access to controls for driving the vehicle, or whether the person lacks controls for driving the vehicle. Vehicles in the present examples are illustrated as being similar or identical to each other for illustrative purposes only.

Examples described herein refer to an ADAS. Assisted driving involves at least partially automating one or more dynamic driving tasks by way of computer-based operations (e.g., by a processor executing instructions). An ADAS can perform assisted driving and is an example of an assisted-driving system. Assisted driving is performed based in part on the output of one or more sensors typically positioned on, under, or within the vehicle, which is sometimes referred to as the ego vehicle. An ADAS can plan one or more trajectories for a vehicle before and/or while controlling the motion of the vehicle. A planned trajectory can define a path for the vehicle's travel. As such, propelling the vehicle according to the planned trajectory can correspond to controlling one or more aspects of the vehicle's operational behavior, such as, but not limited to, the vehicle's steering angle, gear (e.g., forward or reverse), speed, acceleration, and/or braking. As used herein, an ADAS controller is a processor-based device that performs one or more ADAS functions in a vehicle. For example, the ADAS controller can be referred to as an electronic control unit (ECU) of the vehicle.

While an autonomous vehicle is an example of a system that performs assisted driving, not every assisted-driving system is designed to provide a fully autonomous vehicle. Several levels of driving automation have been defined by SAE International, usually referred to as Levels 0, 1, 2, 3, 4, and 5, respectively. For example, a Level 0 system or driving mode may involve no sustained vehicle control by the system. For example, a Level 1 system or driving mode may include adaptive cruise control, emergency brake assist, automatic emergency brake assist, lane-keeping, and/or lane centering. For example, a Level 2 system or driving mode may include highway assist, autonomous obstacle avoidance, and/or autonomous parking. For example, a Level 3 or 4 system or driving mode may include progressively increased control of the vehicle by the assisted-driving system. For example, a Level 5 system or driving mode may require no human intervention of the assisted-driving system.

Examples described herein refer to an infotainment controller. As used herein, an infotainment controller is a processor-based device in a vehicle that performs one or more functions involving infotainment, media, navigation, communication, or vehicle control, or combinations thereof. Infotainment can refer to the human-machine interface for a passenger to interact with the computer(s) of the vehicle. The infotainment controller can provide a graphical user interface, such as supported by touchscreen input technology, keys, and/or voice recognition. The infotainment controller can be referred to as an ECU of the vehicle (e.g., for a front occupant media system).

Examples herein refer to a sensor. A sensor is configured to detect one or more aspects of its environment and output signal(s) reflecting the detection. The detected aspect(s) can be static or dynamic at the time of detection. As illustrative examples only, a sensor can indicate one or more of a distance between the sensor and an object, a speed of a vehicle carrying the sensor, a trajectory of the vehicle, or an acceleration of the vehicle. A sensor can generate output without probing the surroundings with anything (passive sensing, e.g., like an image sensor that captures electromagnetic radiation), or the sensor can probe the surroundings (active sensing, e.g., by sending out electromagnetic radiation and/or sound waves) and detect a response to the probing. Examples of sensors that can be used with one or more embodiments include, but are not limited to: a light sensor (e.g., a camera); a light-based sensing system (e.g., a light ranging and detection (LiDAR) device); a radio-based sensor (e.g., radar); an acoustic sensor (e.g., an ultrasonic device and/or a microphone); an inertial measurement unit (IMU) (e.g., a gyroscope and/or accelerometer); a speed sensor (e.g., for the vehicle or a component thereof); a location sensor (e.g., for the vehicle or a component thereof); an orientation sensor (e.g., for the vehicle or a component thereof); a torque sensor; a thermal sensor; a temperature sensor (e.g., a primary or secondary thermometer); a pressure sensor (e.g., for ambient air or a component of the vehicle); a humidity sensor (e.g., a rain detector); or a seat occupancy sensor.

Examples described herein refer to a camera. As used herein, a camera includes any image sensor that captures electromagnetic radiation.

Examples described herein refer to a display device. As used herein, a display device includes any device that can present visual output generated by one or more processors.

Examples described herein refer to a switch. A switch can include one or more selected from the group consisting of: a radiofrequency switch, a semiconductor device, a digital switch, a multiplexer, a demultiplexer, or a mechanical switch. Examples described herein sometimes refer to the switch as a high speed switch. For example, a high speed switch can be a radiofrequency switch. For example, a high speed switch can be a semiconductor switch. As another example, a high speed switch can be a high speed digital switch. As another example, a high speed switch can be a multiplexer. As another example, a high speed switch can be a demultiplexer. As another example, a high speed switch can be a mechanical switch.

Examples described herein refer to an interface between components, or that components are interfaced with each other. As used herein, interface/interfaced means an electric connection between the components that allows power and/or a signal to be provided in at least one direction.

FIG. 1 shows an example of a vehicle 100 with a system 102 for distributing signals to and/or from multiple controllers. The system 102 can be implemented inside the vehicle 100 (e.g., to serve as part of its control circuitry) and is here shown separate from the vehicle 100 for clarity. The vehicle 100 and/or the system 102 can be used with one or more other examples described elsewhere herein.

The vehicle 100 can include one or more types of sensor. Here, the vehicle 100 includes cameras 104 that are schematically illustrated. In some implementations, the cameras 104 can include multiple cameras distributed around the vehicle and directed towards surroundings 106 of the vehicle. Any number of the cameras 104 can be used. Any type(s) of image sensor that can capture the surroundings 106 can be used as the camera(s) 104. Here, a camera 104A is positioned at the front of the vehicle 100 and is oriented forward; a camera 104B is positioned at the rear of the vehicle 100 and is oriented rearward; a camera 104C is positioned on the left side of the vehicle 100 and is oriented toward the left; and a camera 104D is positioned on the right side of the vehicle 100 and is oriented toward the right. The cameras 104 can have the same or different field of view as each other. For example, one or more of the cameras 104A-104D can be a so-called fisheye camera. Each of the cameras 104 can correspond to a respective channel in the system 102.

The vehicle 100 can include one or more display devices that can be observed (and optionally interacted with) by a passenger. Here, the vehicle 100 includes display devices 108 and 110. In some implementations, both of the display devices 108-110 are positioned in an instrument panel of the vehicle 100. For example, the display device 108 can form, or otherwise be aligned with, an instrument cluster in the vehicle 100. As another example, the display device 110 can be positioned at or aligned with a center console in the vehicle 100.

The system 102 includes one or more high speed (HS) switches 112. The high speed switches 112 can be used for distributing signals in either or both directions between the vehicle 100 and controllers of the system 102. The high speed switches 112 have a sufficient operating frequency band for the kind(s) of signal to be distributed. High-resolution video signals can be distributed, such as using gigabit transmission technology. In some implementations, the high speed switches 112 include a semiconductor device. For example, a metal-oxide-semiconductor switch can be used. In some implementations, at least one of the high speed switches 112 is a mechanical switch with sufficient frequency capacity.

The high speed switches 112 can be interfaced to the cameras 104 by respective cables. Here, a coaxial/twisted pair cable 114A interfaces the camera 104A to the high speed switches 112, a coaxial/twisted pair cable 114B interfaces the camera 104B to the high speed switches 112, a coaxial/twisted pair cable 114C interfaces the camera 104C to the high speed switches 112, and a coaxial/twisted pair cable 114D interfaces the camera 104D to the high speed switches 112. The coaxial/twisted pair cables 114A-114D can be part of a point-to-point architecture. In some implementations, each of the coaxial/twisted pair cables 114A-114D can provide a high speed serializer-deserializer interface between the high speed switches 112 and the corresponding one of the cameras 104A-104D. For example, the coaxial/twisted pair cables 114A-114D can provide a gigabit serial multimedia link (GSML), a flat panel display (FPD) link, or a physical layer conforming to the A-PHY specification from the MIPI standard-setting organization.

The system 102 includes an ADAS controller 116. The ADAS controller 116 is configured for controlling the ADAS of the vehicle 100. The ADAS controller 116 is interfaced to the high speed switches 112 by respective conductors 118. When the high speed switches 112 and the ADAS controller 116 are separate devices the conductors 118 can include coaxial cables. For example, the conductors 118 can provide respective high speed (e.g., GSML/FPD/MIPI-A) connections between the ADAS controller 116 and the high speed switches 112. When the high speed switch 112 is integrated into the ADAS controller 116, the conductors 118 can include respective lines on a circuit board.

The system 102 includes an infotainment controller 120. The infotainment controller 120 is configured for providing infotainment functionality in the vehicle 100. The infotainment controller 120 is interfaced to the high speed switches 112 by respective conductors 122. When the high speed switches 112 and the infotainment controller 120 are separate devices the conductors 122 can include coaxial cables. For example, the conductors 122 can provide respective high speed (e.g., GSML/FPD/MIPI-A) connections between the infotainment controller 120 and the high speed switches 112. When the high speed switches 112 are integrated into the infotainment controller 120, the conductors 122 can include respective lines on a circuit board.

The high speed switches 112 can regulate signal transmission in one or more directions. In operation, the high speed switches 112 can be configured for distribution of a signal from the cameras 104 to either of the ADAS controller 116 or the infotainment controller 120. In some implementations, this distribution can be controlled based on a state of the vehicle. For example, if the ADAS controller 116 provides power over coaxial to the high speed switches 112, then the high speed switches 112 can distribute the camera feed to the ADAS controller 116. As another example, if the infotainment controller 120 provides power over coaxial to the high speed switches 112, then the high speed switches 112 can distribute the camera feed to the infotainment controller 120. As another example, if both the ADAS controller 116 and the infotainment controller 120 are active and provide power over coaxial to the high speed switches 112, then the ADAS controller 116 can have priority over the infotainment controller 120.

The system 102 includes an interface 124 between the ADAS controller 116 and the infotainment controller 120. The interface 124 can allow high-speed communication in either or both directions between the ADAS controller 116 and the infotainment controller 120 without the signals passing through the high speed switches 112 in between. For example, the ADAS controller 116 is configured to provide a signal via the interface 124 for receipt by the infotainment controller 120. In some implementations, the interface 124 can provide an Ethernet connection.

The above examples illustrate a system (e.g., the system 102) in a vehicle (e.g., the vehicle 100) for distributing signals to controllers (e.g., the ADAS controller 116 and the infotainment controller 120). The system includes: an ADAS controller (e.g., the ADAS controller 116) configured for controlling an ADAS of the vehicle; an infotainment controller (e.g., the infotainment controller 120) configured for controlling an infotainment system of the vehicle; a sensor device (e.g., one or more of the cameras 104); and a high speed switch (e.g., any of the high speed switches 112), the high speed switch being powered by power over coaxial from the ADAS controller or the infotainment controller, the high speed switch configured for distribution of a first signal from the sensor device to either of the ADAS controller or the infotainment controller.

The system 102 can facilitate operation of the vehicle 100 in a sentry mode. When a sentry mode is enabled, the cameras/sensors of the vehicle 100 remain powered on and ready to record suspicious activity around the vehicle, which is locked and in Park condition. For example, the sentry mode can allow a passenger in the vehicle 100, while the vehicle 100 is parked, to monitor the surroundings 106 using the cameras 104. The infotainment controller 120 can be interfaced to the display devices 108 and 110 by respective conductors 126. The conductors 126 can provide a high-speed digital video interface. For example, the conductors 126 can provide respective flat panel display (FPD) links between the infotainment controller 120 and the display devices 108 and 110.

In the sentry mode the ADAS controller 116 can be turned off and the infotainment controller 120 can provide the power over coaxial to the high speed switches 112. The high speed switches 112 can distribute the camera signal to the infotainment controller 120 by sensing the ADAS and infotainment power state. The infotainment controller 120 can process and record the camera signal and also generate another signal (e.g., high-speed video content) for presentation on the display device 108 and/or 110. The user may be able to choose among multiple available camera feeds for the presentation, and/or otherwise control the camera feed.

Figure 2A:
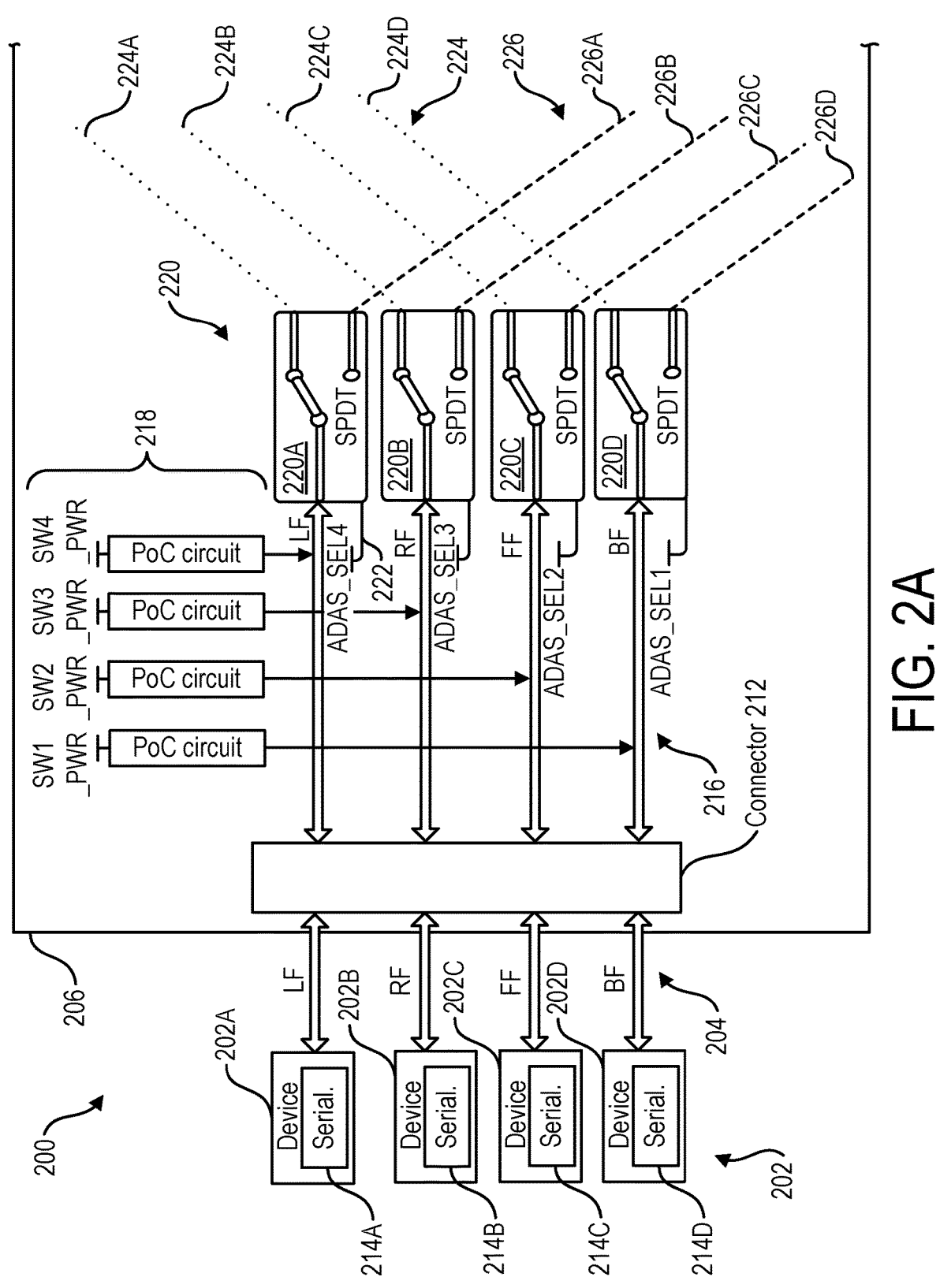
FIGS. 2A-2B show an example of a system that can be implemented in the vehicle of FIG. 1.
Figure 2B:
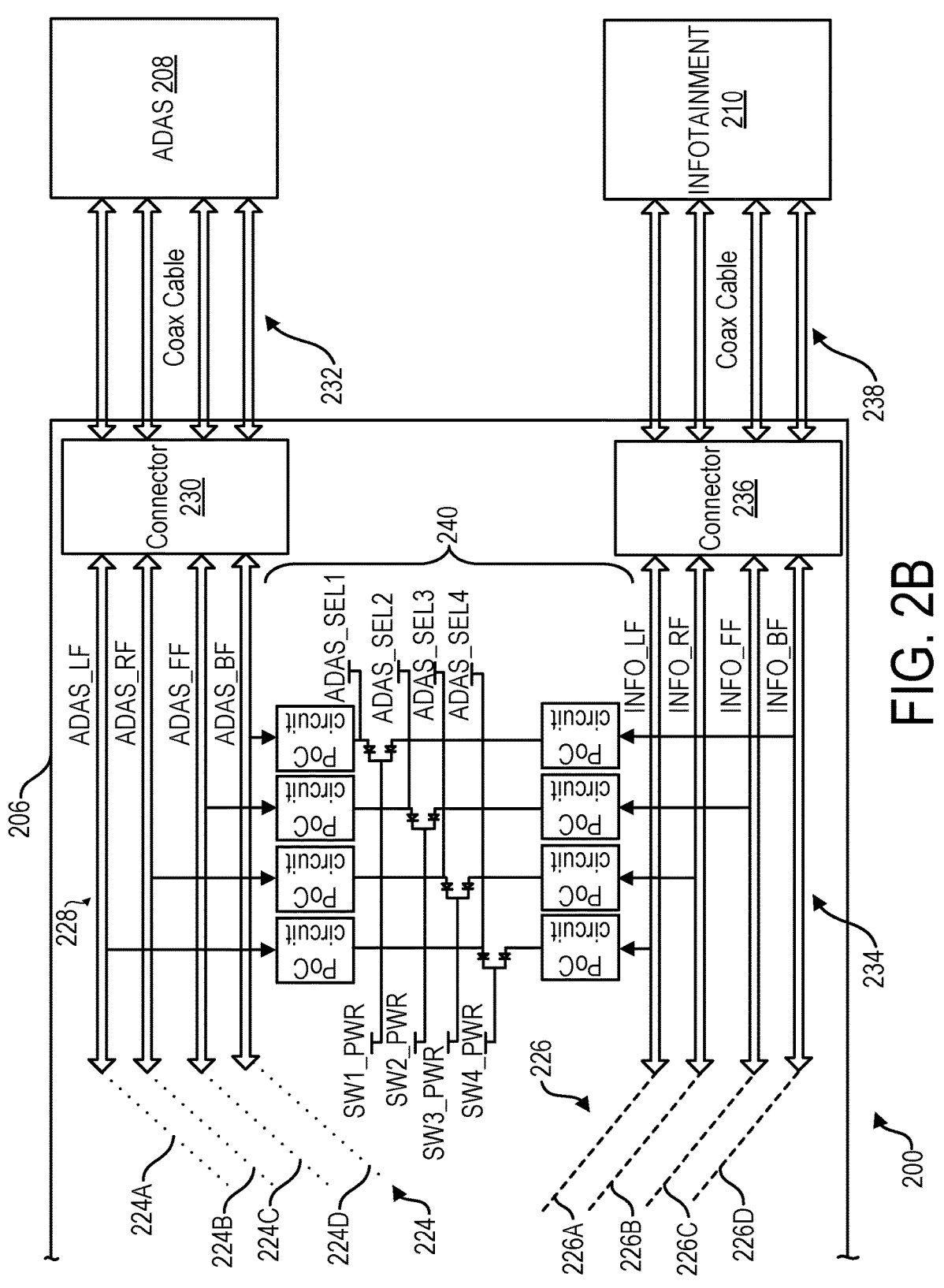

FIGS. 2A-2B show an example of a system 200 that can be implemented in the vehicle 100 of FIG. 1. Also or instead, the system 200 can be used with one or more other examples described elsewhere herein. The system 200 includes any number of devices 202 of the vehicle. Here, devices 202A-202D are shown as an example. In some implementations, one or more of the devices 202 can be a display device. For example, the display device(s) can be part of an infotainment system used by the passenger(s).

In some implementations, one or more of the devices 202 can be a sensor of the vehicle. For example, the device(s) can be at least one camera of the vehicle positioned to capture at least part of the surroundings of the vehicle. Cameras and/or other devices can have their own respective isolated channels in the system 200. In some implementations, the devices 202 are fisheye cameras and the channel for the device 202A can be referred to as "left fisheye" (LF), the channel for the device 202B can be referred to as "right fisheye" (RF), the channel for the device 202C can be referred to as "front fisheye" (FF), and the channel for the device 202D can be referred to as "back fisheye" (BF).

The devices 202 can be interfaced to other aspects of the system 200 by conductors 204. In some implementations, the conductors 204 include a cable assembly with individual cables leading to the devices 202A-202D, respectively. For example, the conductors 204 can form a harness installed in the vehicle.

The system 200 includes switching circuitry 206, an ADAS controller 208, and an infotainment controller 210. The switching circuitry 206 can control the distribution of signals in one or more directions between the device(s) 202, the ADAS controller 208, and/or the infotainment controller 210. In this example, the switching circuitry 206 is separate from the ADAS controller 208 and from the infotainment controller 210. For example, the switching circuitry 206 is formed by one or more circuit boards.

The switching circuitry 206 includes at least one connector 212 to interface with the channel(s) of the device(s) 202. In some implementations, the connector 212 is a single connector with a number of inputs at least equal to the number of channels being used. Any type of connector compatible with the type(s) of signal being distributed can be used. For example, the connector 212 can include a so-called Fakra connector (named after Fachkreis Automobil, an automotive standards group).

In implementations where the devices(s) 202 should generate signals (e.g., when they are sensors, such as cameras), the system 200 can include one or more serializers for the device(s) 202. Here, the device 202A includes a serializer 214A, the device 202B includes a serializer 214B, the device 202C includes a serializer 214C, and the device 202D includes a serializer 214D. The serializers 214A-214D can perform serialization of the sensor output from the respective devices 212A-212D to generate one or more signals (e.g., video feeds of camera output).

The switching circuitry 206 can include conductors 216 that carry the signals to or from the devices 202. In some implementations, the conductors 216 include lines on one or more circuit boards. This example involves four channels and four of the conductors 216 are therefore shown.

The switching circuitry 206 includes power over coaxial circuitry 218. Provision of power over coaxial can allow each of the ADAS controller 208 and the infotainment controller 210 to supply power to any of the devices 202 through the switching circuitry 206. For example, the power over coaxial circuitry 218 can include capacitive and inductive components arranged so that the supplied power and the transmitted signal are conveyed in the same conductor.

The switching circuitry 206 includes high speed switches 220 that control the distribution of signals in one or more directions between the device(s) 202, the ADAS controller 208, and/or the infotainment controller 210. In some implementations, the high speed switches 220 can function similarly or identically to the high speed switches 112 in FIG. 1. For example, a high speed switch 220A can correspond to the LF channel, a high speed switch 220B to the RF channel, a high speed switch 220C to the FF channel, and a high speed switch 220D to the BF channel. Each of the high speed switches 220 can include any switching configuration, including, but not limited to, a single pole, double throw (SPDT). Any of various combinations can be used, including but not limited to, multiplexing and/or de-multiplexing. Each of the high speed switches 220 can include a selector 222 that controls the respective switch. For example, the selector 222 can control the switch depending on the state of the vehicle power. The conductors 216 can provide high speed (e.g., GSML/FPD/MIPI-A) connections between the high speed switches 220 and respective ones of the devices 202.

The high speed switches 220 can form any of multiple connections in the system 200. Here, connections 224 are schematically shown as dotted lines and represent interfacing between the high speed switches 220 and the ADAS controller 208. The connections 224 can include a respective connection for each channel in the system 200. Here, connections 224A-224D are shown for illustrative purposes. For example, the connection 224A can correspond to an LF channel, the connection 224B to an RF channel, the connection 224C to an FF channel, and the connection 224D to a BF channel.

Similarly, connections 226 are schematically shown as dashed lines and represent interfacing between the high speed switches 220 and the infotainment controller 208. The connections 226 can include a respective connection for each channel in the system 200. Here, connections 226A-226D are shown for illustrative purposes. For example, the connection 226A can correspond to an LF channel, the connection 226B to an RF channel, the connection 226C to an FF channel, and the connection 226D to a BF channel.

The switching circuitry 206 can include conductors 228 that carry the signals to or from the ADAS controller 208. In some implementations, the conductors 228 include lines on one or more circuit boards. This example involves four channels and four of the conductors 228 are therefore shown. The conductors 228 can provide high speed (e.g., GSML/FPD/MIPI-A) connections between the high speed switches 220 and the ADAS controller 208.

The switching circuitry 206 includes at least one connector 230 to interface with the ADAS controller 208. In some implementations, the connector 230 is a single connector with a number of inputs at least equal to the number of channels being used. For example, the connector 230 can include a Fakra connector.

The ADAS controller 208 can be interfaced to one or more aspects of the system 200 by conductors 232. The conductors 232 can provide high speed (e.g., GSML/FPD/ MIPI-A) connections between the high speed switches 220 and the ADAS controller 208. In some implementations, the conductors 232 include a cable assembly with individual cables corresponding to the respective channels. Any type of conductors compatible with the type(s) of signal being distributed can be used, including, but not limited to, coaxial cables.

The switching circuitry 206 can include conductors 234 that carry the signals to or from the infotainment controller 210. In some implementations, the conductors 234 include lines on one or more circuit boards. This example involves four channels and four of the conductors 234 are therefore shown. The conductors 234 can provide high speed (e.g., GSML/FPD/MIPI-A) connections between the high speed switches 220 and the infotainment controller 210.

The switching circuitry 206 includes at least one connector 236 to interface with the infotainment controller 210. In some implementations, the connector 236 is a single connector with a number of inputs at least equal to the number of channels being used. For example, the connector 236 can include a Fakra connector.

The infotainment controller 210 can be interfaced to one or more aspects of the system 200 by conductors 238. The conductors 238 can provide high speed (e.g., GSML/FPD/ MIPI-A) connections between the high speed switches 220 and the infotainment controller 210. In some implementations, the conductors 238 include a cable assembly with individual cables corresponding to the respective channels.

Any type of conductors compatible with the type(s) of signal being distributed can be used, including, but not limited to, coaxial cables.

The switching circuitry 206 includes power over coaxial circuitry 240. Provision of power over coaxial can allow each of the ADAS controller 208 and the infotainment controller 210 to supply power to any of the devices 202 through the switching circuitry 206. For example, the power over coaxial circuitry 240 can include capacitive and inductive components arranged so that the supplied power and the transmitted signal travel in the same conductor.

The high speed switches 220 can be configured so that whichever one of the ADAS controller 208 or the infotainment controller 210 provides the power over coaxial to any of the high speed switches 220, that high speed switch 220 closes the connection of that controller. That is, a logical OR function can be applied to the powers of the controllers. When the devices 202 are cameras, this can include that the high speed switch 220 distributes a signal from one of the cameras to the one of the ADAS controller 208 or the infotainment controller 210 that supplies power to the high speed switch 220. The high speed switches 220 need not have a separate power supply. The power output from the power over coaxial circuitry 240 can be demodulated, a very small amount of power can be used for the switching circuitry 206, the remaining power can be put back on the power over coaxial circuitry 218 to power the device(s) 202 (e.g., a camera).

The high speed switches 220 can use prioritization in case both of the ADAS controller 208 and the infotainment controller 210 simultaneously provide the power over coaxial to any of the high speed switches 220. In some implementations, the high speed switches 220 can prioritize the ADAS controller 208. For example, during normal operation of the vehicle both of the ADAS controller 208 and the infotainment controller 210 may be powered up, and the prioritization can then ensure that a signal (e.g., a camera feed) is provided to the ADAS controller 208. In some implementations, the high speed switches 220 can prioritize the infotainment controller 210.

The above examples have focused on signal distribution from the device(s) 202 (e.g., cameras) to either of the ADAS controller 208 and the infotainment controller 210. Signal distribution in the system 200 can also or instead occur in a different direction. In some implementations, one or more of the devices 202 can be a display device, and the high speed switch(es) 220 can be used for controlling which controller's output the display device should present. Similar functionality to that described above can be used, including but not limited to, that the high speed switches 220 can connect the device(s) 202 to the one of the ADAS controller 208 or the infotainment controller 210 that supplies power over coaxial. As another example, a prioritization can be applied in case the controllers simultaneously supply power.

The immediately preceding example illustrates a system (e.g., the system 200) in a vehicle (e.g., the vehicle 100 in FIG. 1) for distributing signals from controllers (e.g., the ADAS controller 208 and the infotainment controller 210). The system includes: an ADAS controller (e.g., the ADAS controller 208) configured for controlling an ADAS of the vehicle; an infotainment controller (e.g., the infotainment controller 210) configured for controlling an infotainment system of the vehicle; a display device (e.g., one or more of the devices 202); and an high speed switch (e.g., any of the high speed switches 220), the high speed switch being powered by power over coaxial from the ADAS controller or the infotainment controller, the high speed switch configured for distribution of a first signal from either of the ADAS controller or the infotainment controller to the display device.

Figure 3:
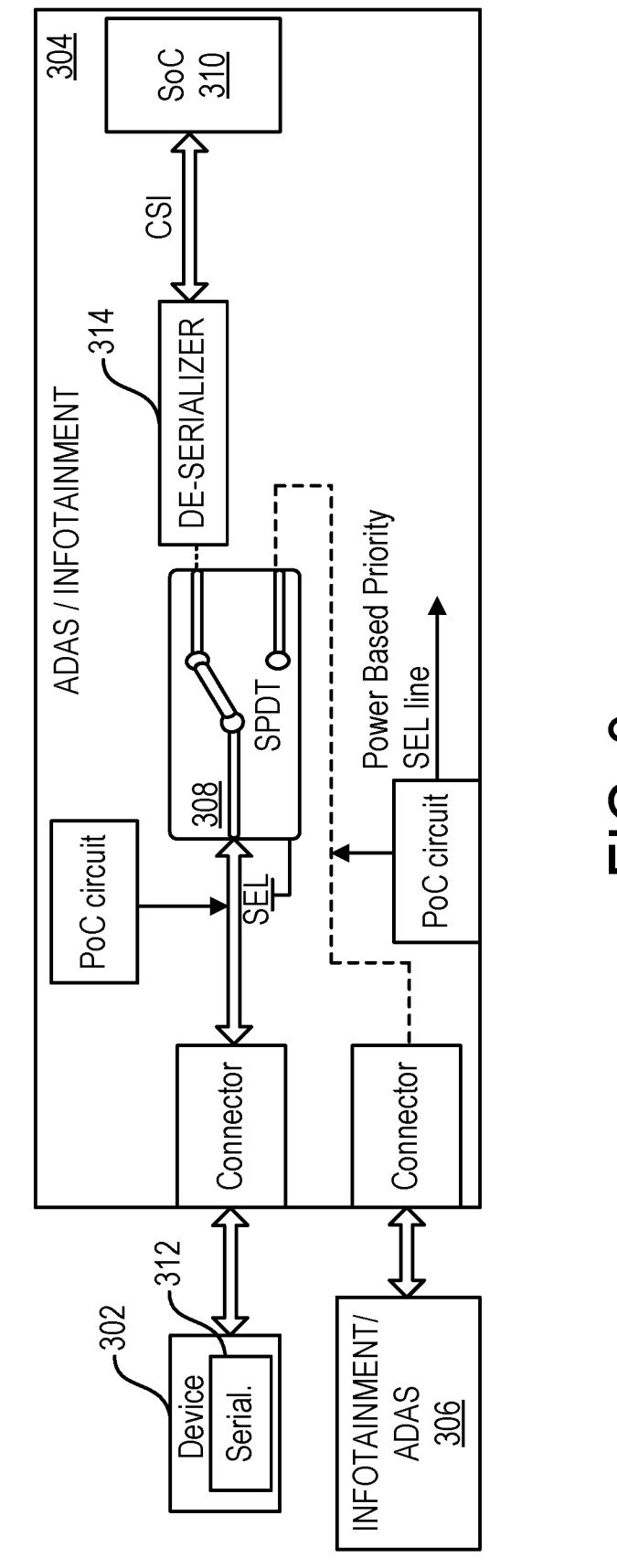
FIG. 3 shows another example of a system that can be implemented in the vehicle of FIG. 1.

FIG. 3 shows another example of a system 300 that can be implemented in the vehicle 100 of FIG. 1. Also or instead, the system 300 can be used with one or more other examples described elsewhere herein. The system 300 includes any number of devices 302 of the vehicle. Here, one device is shown as an example. The system 300 includes a controller 304 that is of a first type (e.g., one of either an ADAS controller or an infotainment controller), and a controller 306 that is of a second type (e.g., the other one of either an ADAS controller or an infotainment controller). The controller 304 includes at least one high speed switch 308 that can selectively enable a connection between the device 302 and a system-on-chip (SOC) 310 of the controller 304, or a connection between the device 302 and the controller 306. The device 302 (e.g., a sensor such as a camera) can include a serializer 312 for serializing the camera feed (e.g., a video feed), and the controller 304 can include a de-serializer 314 before the SOC 310. The system 300 can provide power over coaxial from either of the controllers 304-306, similar to the examples described above with reference to FIGS. 2A-2B. Either or both of the controllers 304-306 can include connectors and conductors in analogy with examples described above. For example, some components (e.g., connector and/or power over coaxial or other filter circuits) may already exist in the controller 304 and can be used in facilitating the possibility of forwarding signals to either of the controllers 304-306. That is, in the present example the high speed switch 308 is integrated into a first controller (e.g., the ADAS controller or the infotainment controller), and a second controller (the infotainment controller or the ADAS controller) is interfaced to the first controller.

The present example illustrates a system (e.g., the system 300) in a vehicle (e.g., the vehicle 100 in FIG. 1) for distributing signals to controllers (e.g., the controllers 304-306). The system includes: an ADAS controller (e.g., the controller 304 or 306) configured for controlling an ADAS of the vehicle; an infotainment controller (e.g., the controller 306 or 304) configured for controlling an infotainment system of the vehicle; a sensor device (e.g., one or more of the cameras 104 in FIG. 1); and a high speed switch (e.g., the high speed switch 308), the high speed switch being powered by power over coaxial from the ADAS controller or the infotainment controller, the high speed switch configured for distribution of a first signal from the sensor device to either of the ADAS controller or the infotainment controller.

The present example also illustrates a system (e.g., the system 300) in a vehicle (e.g., the vehicle 100 in FIG. 1) for distributing signals from controllers (e.g., the controller 304 or 306). The system includes: an ADAS controller (e.g., the controller 304 or 306) configured for controlling an ADAS of the vehicle; an infotainment controller (e.g., the controller 306 or 304) configured for controlling an infotainment system of the vehicle; a display device (e.g., the device 302); and a high speed switch (e.g., the high speed switch 308), the high speed switch being powered by power over coaxial from the ADAS controller or the infotainment controller, the high speed switch configured for distribution of a first signal from either of the ADAS controller or the infotainment controller to the display device.

Figure 4:
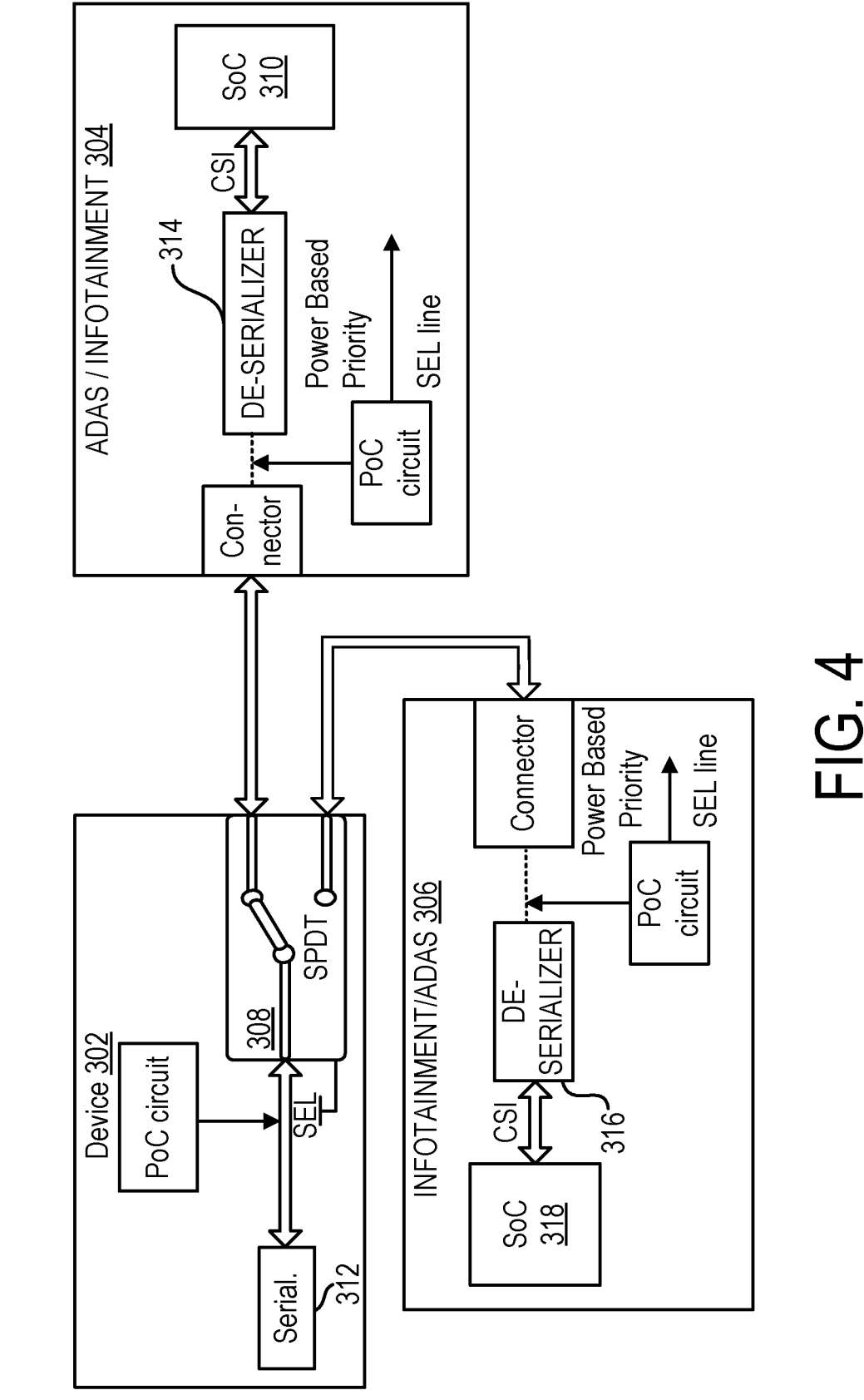
FIG. 4 shows another example involving components of the system in FIG. 3.

FIG. 4 shows another example involving components of the system 300 in FIG. 3. This example can be used with one or more other examples described elsewhere herein. Unlike the example in FIGS. 2A-2B where the high speed switches 220 are implemented in a separate device, and unlike the example in FIG. 3 where the high speed switch 308 is integrated into the controller 304, the high speed switch 308 is here integrated with the device 302. The device 302 can include, but is not limited to, a sensor device (e.g., a camera) or a display device. The controller 306 can include a de-serializer 316 before a SOC 318.

In operation, the serializer 312 serializes sensor signals (e.g., a camera feed), and the high speed switch 308 can provide the signal to either the controller 304 or the controller 306 depending on which of the controllers 304-306 is active and powers the device 302. The system 300 can provide power over coaxial from either of the controllers 304-306. When both the controllers 304-306 are active, the signal can be distributed according to a prioritization. Components not explicitly mentioned can operate similarly or identically as described above.

Figure 5:
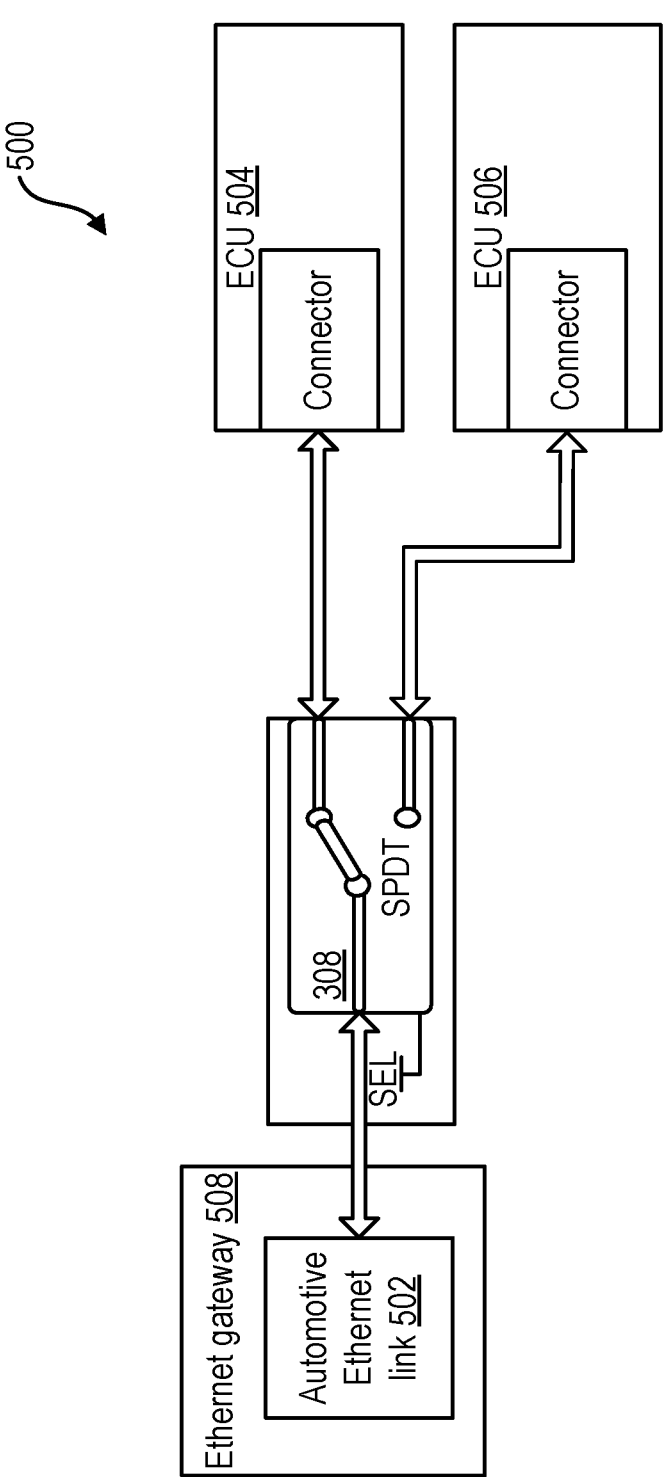
FIG. 5 shows an example of a system where the high speed switch of FIG. 3 is used for switching an Automotive Ethernet link between electronic control units of a vehicle.

FIG. 5 shows an example of a system 500 where the high speed switch 308 of FIG. 3 is used for switching an Automotive Ethernet link 502 between ECUs 504-506 of a vehicle. As such, a vehicle can include the system 500 to facilitate communication to and/or from vehicle components. The system 500 or any aspect thereof can be used with one or more other examples described elsewhere herein.

The Automotive Ethernet link 502 can provide Automotive Ethernet network communication according to a published standard. In operation, the high speed switch 308 can connect either the ECU 504 or the ECU 506 to the Automotive Ethernet link 502 depending on which of the ECUs 504-506 is active. When both the ECUs 504-506 are active, the connection can be made according to a prioritization. As such, the system 500 can switch the Automotive Ethernet link 502 between the ECUs 504-506.

The Automotive Ethernet link 502 can be provided by an Ethernet gateway 508 of the vehicle. For example, the Ethernet gateway 508 is implemented using a combination of software and hardware. The Ethernet gateway 508 can serve as a part of an Ethernet network in the vehicle. For example, the Ethernet gateway 508 performs encapsulation and decapsulation of non-Ethernet messages into Ethernet packets/frames; reads virtual local area network tags, and labels messages with them; and/or routs Ethernet packets/frames.

Here, the high speed switch 308 is implemented as a device that is separate from the ECUs 504-506 and from the Ethernet gateway 508. In some implementations, the high speed switch 308 can instead be integrated into the Ethernet gateway 508 (e.g., in analogy to examples of FIG. 4). In some implementations, the high speed switch 308 can instead be integrated into either of the ECUs 504-506 (e.g., in analogy to examples of FIG. 3).

FIG. 6 shows an example of a vehicle 600. The vehicle 600 can be used with one or more other examples described elsewhere herein. The vehicle 600 includes an ADAS 602 and vehicle controls 604. The ADAS 602 includes sensors 606 and a planning algorithm 608. Other aspects that the vehicle 600 may include, including, but not limited to, other components of the vehicle 600 where the ADAS 602 may be implemented, are omitted here for simplicity.

The sensors 606 are here described as also including appropriate circuitry and/or executable programming for processing sensor output and performing a detection based on the processing. The sensors 606 can include a radar 610. In some implementations, the radar 610 can include any object detection system that is based at least in part on radio waves. For example, the radar 610 can be oriented in a forward direction relative to the vehicle and can be used for detecting at least a distance to one or more other objects (e.g., another vehicle). The radar 610 can detect the surroundings of the vehicle 600 by sensing the presence of an object in relation to the vehicle 600.

The sensors 606 can include an active light sensor 612. In some implementations, the active light sensor 612 can include any object detection system that is based at least in part on laser light or LED light. For example, the active light sensor 612 can include a LiDAR. The active light sensor 612 can be oriented in any direction relative to the vehicle and can be used for detecting at least a distance to one or more other objects (e.g., another vehicle). The active light sensor 612 can detect the surroundings of the vehicle 600 by sensing the presence of an object in relation to the vehicle 600.

The sensors 606 can include one or more cameras 614. In some implementations, the cameras 614 can include any image sensor whose signal(s) the vehicle 600 takes into account. For example, the cameras 614 can be oriented in any of multiple directions relative to the vehicle and can be used for detecting vehicles or other objects, lanes, lane markings, curbs, and/or road signage.

The sensors 606 can include an ultrasonic sensor 616. The ultrasonic sensor 616 can include any device that determines location based on generating and detecting sound waves.

Any of the sensors 606 alone, or two or more of the sensors 606 collectively, can detect, whether or not the ADAS 602 is controlling motion of the vehicle 600, the surroundings of the vehicle 600. In some implementations, at least one of the sensors 606 can generate an output that is taken into account in providing a prompt to a driver, and/or in controlling motion of the vehicle 600. For example, the output of two or more sensors can be combined. In some implementations, one or more other types of sensors can additionally or instead be included in the sensors 606. The ADAS 602 can perform motion planning and/or plan a trajectory for the vehicle 600 based on the output(s) of one or more of the sensors 606.

The vehicle controls 604 can include a steering control 618. In some implementations, the ADAS 602 and/or another driver of the vehicle 600 controls the trajectory of the vehicle 600 by adjusting a steering angle of at least one wheel by way of manipulating the steering control 618. The steering control 618 can be configured for controlling the steering angle though a mechanical connection between the steering control 618 and the adjustable wheel, or can be part of a steer-by-wire system.

The vehicle controls 604 can include a gear control 620. In some implementations, the ADAS 602 and/or another driver of the vehicle 600 uses the gear control 620 to choose from among multiple operating modes of a vehicle (e.g., a Drive mode, a Neutral mode, or a Park mode). For example, the gear control 620 can be used to control an automatic transmission in the vehicle 600.

The vehicle controls 604 can include signal controls 622. In some implementations, the signal controls 622 can control one or more signals that the vehicle 600 can generate. For example, the signal controls 622 can control a turn signal and/or a horn of the vehicle 600.

The vehicle controls 604 can include brake controls 624. In some implementations, the brake controls 624 can control one or more types of braking systems designed to slow down the vehicle, stop the vehicle, and/or maintain the vehicle at a standstill when stopped. For example, the brake controls 624 can be actuated by the ADAS 602. As another example, the brake controls 624 can be actuated by the driver using a brake pedal.

The vehicle controls 604 can include a vehicle dynamic system 626. In some implementations, the vehicle dynamic system 626 can control one or more functions of the vehicle 600 in addition to, or in the absence of, or in lieu of, the driver's control. For example, when the vehicle comes to a stop on a hill, the vehicle dynamic system 626 can hold the vehicle at standstill if the driver does not activate the brake control 624 (e.g., step on the brake pedal).

The vehicle controls 604 can include an acceleration control 628. In some implementations, the acceleration control 628 can control one or more types of propulsion motor of the vehicle. For example, the acceleration control 628 can control the electric motor(s) and/or the internal-combustion motor(s) of the vehicle 600.

The vehicle controls 604 can include one or more other controls 630 in addition to those exemplified above.

The vehicle 600 can include a user interface 632. The user interface 632 can include an audio interface 634. In some implementations, the audio interface 634 can include one or more speakers positioned in the passenger compartment. For example, the audio interface 634 can at least in part operate together with an infotainment system in the vehicle.

The user interface 632 can include a visual interface 636. In some implementations, the visual interface 636 can include at least one display device in the passenger compartment of the vehicle 600. For example, the visual interface 636 can include a touchscreen device and/or an instrument cluster display.

The following are further examples relating to the present subject matter. Each of the examples is referred to as a "clause" for identification.

Clause 1. A vehicle comprising: a first electronic control unit (ECU); a second ECU; an Automotive Ethernet link; and a switch configured to switch the Automotive Ethernet link between the first ECU and the second ECU based on which of the first ECU or the second ECU is active.

Clause 2. The vehicle of Clause 1, wherein the switch is separate from the first and second ECUs.

Clause 3. The vehicle of Clause 1, wherein the switch is integrated in one of the first and second ECUs.

Clause 4. The vehicle of Clause 1, further comprising an Ethernet gateway that provides the Automotive Ethernet link.

Clause 5. The vehicle of Clause 4, wherein the Automotive Ethernet link is integrated in the Ethernet gateway.

Clause 6. The vehicle of Clause 1, wherein the switch comprises at least one selected from the group consisting of a radiofrequency switch, a semiconductor device, a digital switch, a multiplexer, a demultiplexer, or a mechanical switch.

Clause 7. The vehicle of Clause 1, wherein the switch is configured so that: i) whichever one of the first and second ECUs is active, the switch switches the Automotive Ethernet link to that one of the first or second ECUs; and ii) in case both of the first and second ECUs simultaneously is active, the switch has a prioritization to switch the Automotive Ethernet link to only one of the first or second ECUs.

Computer-based techniques, processes, components, or systems described herein can be implemented by way of one or more processors executing instructions stored in a non-transitory computer-readable medium.

Figure 7:
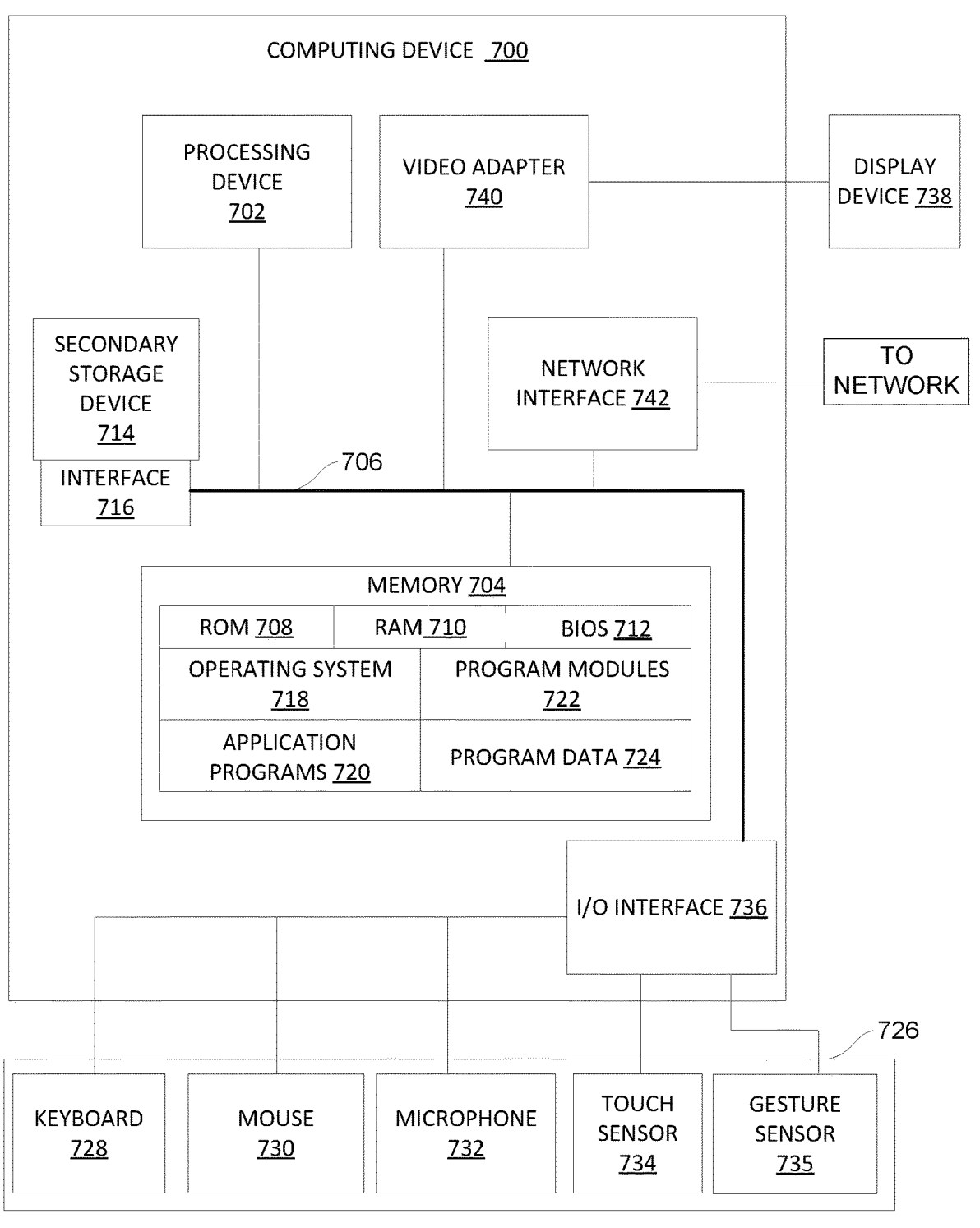
FIG. 7 illustrates an example architecture of a computing device that can be used to implement aspects of the present disclosure.

FIG. 7 illustrates an example architecture of a computing device 700 that can be used to implement aspects of the present disclosure, including any of the systems, apparatuses, and/or techniques described herein, or any other systems, apparatuses, and/or techniques that may be utilized in the various possible embodiments.

The computing device illustrated in FIG. 7 can be used to execute the operating system, application programs, and/or software modules (including the software engines) described herein.

The computing device 700 includes, in some embodiments, at least one processing device 702 (e.g., a processor), such as a central processing unit (CPU). A variety of processing devices are available from a variety of manufacturers, for example, Intel or Advanced Micro Devices. In this example, the computing device 700 also includes a system memory 704, and a system bus 706 that interfaces various system components including the system memory 704 to the processing device 702. The system bus 706 is one of any number of types of bus structures that can be used, including, but not limited to, a memory bus, or memory controller; a peripheral bus; and a local bus using any of a variety of bus architectures.

Examples of computing devices that can be implemented using the computing device 700 include a desktop computer, a laptop computer, a tablet computer, a mobile computing device (such as a smart phone, a touchpad mobile digital device, or other mobile devices), or other devices configured to process digital instructions.

The system memory 704 includes read only memory 708 and random access memory 710. A basic input/output system 712 containing the basic routines that act to transfer information within computing device 700, such as during start up, can be stored in the read only memory 708.

The computing device 700 also includes a secondary storage device 714 in some embodiments, such as a hard disk drive, for storing digital data. The secondary storage device 714 is connected to the system bus 706 by a secondary storage interface 716. The secondary storage device 714 and its associated computer readable media provide non-volatile and non-transitory storage of computer readable instructions (including application programs and program modules), data structures, and other data for the computing device 700.

Although the example environment described herein employs a hard disk drive as a secondary storage device, other types of computer readable storage media are used in other embodiments. Examples of these other types of computer readable storage media include magnetic cassettes, flash memory cards, solid-state drives (SSD), digital video disks, Bernoulli cartridges, compact disc read only memories, digital versatile disk read only memories, random access memories, or read only memories. Some embodiments include non-transitory media. For example, a computer program product can be tangibly embodied in a non-transitory storage medium. Additionally, such computer readable storage media can include local storage or cloud-based storage.

A number of program modules can be stored in secondary storage device 714 and/or system memory 704, including an operating system 718, one or more application programs 720, other program modules 722 (such as the software engines described herein), and program data 724. The computing device 700 can utilize any suitable operating system.

In some embodiments, a user provides inputs to the computing device 700 through one or more input devices 726. Examples of input devices 726 include a keyboard 728, mouse 730, microphone 732 (e.g., for voice and/or other audio input), touch sensor 734 (such as a touchpad or touch sensitive display), and gesture sensor 735 (e.g., for gestural input). In some implementations, the input device(s) 726 provide detection based on presence, proximity, and/or motion. Other embodiments include other input devices 726.

The input devices can be connected to the processing device 702 through an input/output interface 736 that is interfaced to the system bus 706. These input devices 726 can be connected by any number of input/output interfaces, such as a parallel port, serial port, game port, or a universal serial bus. Wireless communication between input devices 726 and the input/output interface 736 is possible as well, and includes infrared, BLUETOOTH® wireless technology, 802.11a/b/g/n, cellular, ultra-wideband (UWB), ZigBee, or other radio frequency communication systems in some possible embodiments, to name just a few examples.

In this example embodiment, a display device 738, such as a monitor, liquid crystal display device, light-emitting diode display device, projector, or touch sensitive display device, is also connected to the system bus 706 via an interface, such as a video adapter 740. In addition to the display device 738, the computing device 700 can include various other peripheral devices (not shown), such as speakers or a printer.

The computing device 700 can be connected to one or more networks through a network interface 742. The network interface 742 can provide for wired and/or wireless communication. In some implementations, the network interface 742 can include one or more antennas for transmitting and/or receiving wireless signals. When used in a local area networking environment or a wide area networking environment (such as the Internet), the network interface 742 can include an Ethernet interface. Other possible embodiments use other communication devices. For example, some embodiments of the computing device 700 include a modem for communicating across the network.

The computing device 700 can include at least some form of computer readable media. Computer readable media includes any available media that can be accessed by the computing device 700. By way of example, computer readable media include computer readable storage media and computer readable communication media.

Computer readable storage media includes volatile and nonvolatile, removable and non-removable media implemented in any device configured to store information such as computer readable instructions, data structures, program modules or other data. Computer readable storage media includes, but is not limited to, random access memory, read only memory, electrically erasable programmable read only memory, flash memory or other memory technology, compact disc read only memory, digital versatile disks or other optical storage, magnetic cassettes, magnetic tape, magnetic disk storage or other magnetic storage devices, or any other medium that can be used to store the desired information and that can be accessed by the computing device 700.

Computer readable communication media typically embodies computer readable instructions, data structures, program modules or other data in a modulated data signal such as a carrier wave or other transport mechanism and includes any information delivery media. The term "modulated data signal" refers to a signal that has one or more of its characteristics set or changed in such a manner as to encode information in the signal. By way of example, computer readable communication media includes wired media such as a wired network or direct-wired connection, and wireless media such as acoustic, radio frequency, infrared, and other wireless media. Combinations of any of the above are also included within the scope of computer readable media.

The computing device illustrated in FIG. 7 is also an example of programmable electronics, which may include one or more such computing devices, and when multiple computing devices are included, such computing devices can be interfaced together with a suitable data communication network so as to collectively perform the various functions, methods, or operations disclosed herein.

In some implementations, the computing device 700 can be characterized as an ADAS computer. For example, the computing device 700 can include one or more components sometimes used for processing tasks that occur in the field of artificial intelligence (AI). The computing device 700 then includes sufficient proceeding power and necessary support architecture for the demands of ADAS or AI in general. For example, the processing device 702 can include a multicore architecture. As another example, the computing device 700 can include one or more co-processors in addition to, or as part of, the processing device 702. In some implementations, at least one hardware accelerator can be interfaced to the system bus 706. For example, a graphics processing unit can be used. In some implementations, the computing device 700 can implement a neural network-specific hardware to handle one or more ADAS tasks.

The terms "substantially" and "about" used throughout this Specification are used to describe and account for small fluctuations, such as due to variations in processing. For example, they can refer to less than or equal to ±5%, such as less than or equal to ±2%, such as less than or equal to ±1%, such as less than or equal to ±0.5%, such as less than or equal to ±0.2%, such as less than or equal to ±0.1%, such as less than or equal to ±0.05%. Also, when used herein, an indefinite article such as "a" or "an" means "at least one."

It should be appreciated that all combinations of the foregoing concepts and additional concepts discussed in greater detail below (provided such concepts are not mutually inconsistent) are contemplated as being part of the inventive subject matter disclosed herein. In particular, all combinations of claimed subject matter appearing at the end of this disclosure are contemplated as being part of the inventive subject matter disclosed herein.

A number of implementations have been described. Nevertheless, it will be understood that various modifications may be made without departing from the spirit and scope of the specification.

In addition, the logic flows depicted in the figures do not require the particular order shown, or sequential order, to achieve desirable results. In addition, other processes may be provided, or processes may be eliminated, from the described flows, and other components may be added to, or removed from, the described systems. Accordingly, other implementations are within the scope of the following claims.

While certain features of the described implementations have been illustrated as described herein, many modifications, substitutions, changes and equivalents will now occur to those skilled in the art. It is, therefore, to be understood that appended claims are intended to cover all such modifications and changes as fall within the scope of the implementations. It should be understood that they have been presented by way of example only, not limitation, and various changes in form and details may be made. Any portion of the apparatus and/or methods described herein may be combined in any combination, except mutually exclusive combinations. The implementations described herein can include various combinations and/or sub-combinations of the functions, components and/or features of the different implementations described.

What is claimed is:

1. A system in a vehicle for distributing signals to controllers, the system comprising:
   an advanced driver assistance system (ADAS) controller configured for controlling an ADAS of the vehicle;
   an infotainment controller configured for controlling an infotainment system of the vehicle;
   a sensor device; and
   a switch, the switch being powered by power over coaxial from the ADAS controller or the infotainment controller, the switch configured for distribution of a first signal from the sensor device to either of the ADAS controller or the infotainment controller.

2. The system of claim 1, wherein the sensor device comprises a camera of the vehicle.

3. The system of claim 2, wherein the sensor device comprises multiple cameras distributed around the vehicle and directed towards surroundings of the vehicle, and wherein the system further comprises multiple switches, each for a corresponding one of multiple isolated channels for the multiple cameras.

4. The system of claim 2, wherein the camera includes a serializer configured to perform serialization that generates the first signal.

5. The system of claim 2, wherein the system is configured to operate in a sentry mode, wherein in the sentry mode the ADAS controller is turned off, and wherein in the sentry mode the infotainment controller provides the power over coaxial to the switch, and the switch distributes the first signal to the infotainment controller.

6. The system of claim 5, further comprising a display device in the vehicle, wherein the infotainment controller is configured to generate a second signal for the display device in the sentry mode, the second signal based on the first signal from the camera.

7. The system of claim 1, wherein the switch comprises at least one selected from the group consisting of a radiofrequency switch, a semiconductor device, a digital switch, a multiplexer, a demultiplexer, or a mechanical switch.

8. The system of claim 1, wherein the switch is separate from the ADAS controller and from the infotainment controller.

9. The system of claim 1, wherein the switch is integrated into the ADAS controller, and wherein the infotainment controller is interfaced to the ADAS controller.

10. The system of claim 1, wherein the switch is integrated into the infotainment controller, and wherein the ADAS controller is interfaced to the infotainment controller.

11. The system of claim 1, wherein the switch is integrated into the sensor device.

12. The system of claim 1, wherein the switch is configured so that:
   i) whichever one of the ADAS controller or the infotainment controller provides the power over coaxial to the switch, the switch distributes the first signal to that one of the ADAS controller or the infotainment controller; and
   ii) in case both of the ADAS controller and the infotainment controller simultaneously provide the power over coaxial to the switch, the switch has a prioritization to distribute the first signal to only one of the ADAS controller or the infotainment controller.

13. The system of claim 12, wherein the prioritization is to distribute the first signal to the ADAS controller.

14. The system of claim 12, wherein the prioritization is to distribute the first signal to the infotainment controller.

15. The system of claim 1, further comprising an interface between the ADAS controller and the infotainment controller, wherein the ADAS controller is configured to provide a second signal via the interface for receipt by the infotainment controller without the second signal passing through the switch.

16. A system in a vehicle for distributing signals from controllers, the system comprising:

an advanced driver assistance system (ADAS) controller configured for controlling an ADAS of the vehicle;

an infotainment controller configured for controlling an infotainment system of the vehicle;

a display device; and a switch, the switch being powered by power over coaxial from the ADAS controller or the infotainment controller, the switch configured for distribution of a first signal from either of the ADAS controller or the infotainment controller to the display device.

17. The system of claim 16, wherein the switch comprises at least one selected from the group consisting of a radiofrequency switch, a semiconductor device, a digital switch, a multiplexer, a demultiplexer, or a mechanical switch.

18. The system of claim 16, wherein the switch is separate from the ADAS controller and from the infotainment controller.

19. The system of claim 16, wherein the switch is integrated into the ADAS controller, and wherein the infotainment controller is interfaced to the ADAS controller.

20. The system of claim 16, wherein the switch is integrated into the infotainment controller, and wherein the ADAS controller is interfaced to the infotainment controller.

21. The system of claim 16, wherein the switch is configured so that:

i) whichever one of the ADAS controller or the infotainment controller provides the power over coaxial to the switch, the switch distributes the first signal, generated by that one of the ADAS controller or the infotainment controller, to the display device; and ii) in case both of the ADAS controller and the infotainment controller simultaneously provide the power over coaxial to the switch, the switch has a prioritization to distribute the first signal, generated by that one of the ADAS controller or the infotainment controller, to the display device.

* * * * *